Sept. 29, 1964  F. S. WRIGHT  3,150,949
METHOD AND APPARATUS FOR DIRECT LOADING
OF MACHINE-MADE ARTICLES INTO A LEHR
Filed May 20, 1958  6 Sheets-Sheet 5

INVENTOR
FRANCIS S. WRIGHT
BY J. R. NELSON &
W. A. SCHAICH
ATTORNEYS

United States Patent Office 3,150,949
Patented Sept. 29, 1964

3,150,949
METHOD AND APPARATUS FOR DIRECT LOADING OF MACHINE-MADE ARTICLES INTO A LEHR
Francis Stanley Wright, Toledo, Ohio, assignor to Owens-Illinois Glass Company, a corporation of Ohio
Filed May 20, 1958, Ser. No. 736,626
5 Claims. (Cl. 65—62)

The present invention relates to glassware annealing lehrs for use in conjunction with present day high speed automatic glassware forming machines, and more particularly to method and apparatus for handling and annealing glassware articles, such as bottles, jars and the like, which are produced in molds of these forming machines, with a minimum of handling and within a minimum period of time.

Under present method and apparatus for annealing formed glassware produced in the glass plant, the formed ware is customarily transferred from the finishing mold of the forming machine by a take-out device and deposited on a stationary surface or a dead plate, whereupon it is pushed onto a nearby machine conveyor. This conveyor transports the ware over a substantial distance to a location remote from the machine where the articles of ware are each handled by a transfer device and placed on a flight conveyor which leads to a cross conveyor traveling across the loading end of the traveling mat or conveyor of an annealing lehr. Another transfer device must effect a transfer from the flight conveyor to this cross conveyor, and while the ware is on the cross conveyor in a line or row across the loading end of the lehr, it is then transferred to the lehr mat, usually by a pusher bar type lehr loading device. The lehr mat then carries the ware through the lehr for annealing and then cooling to a handling temperature.

During travel of the ware to the lehr, it is generally provided that the ware changes its direction of travel one or more times, each change of direction requiring handling by a transfer device, such as a starwheel transfer mechanism. Each transfer results in the loss of ware and each transfer device requires considerable maintenance to keep these losses to a minimum.

Normally, during movement of the ware from the mold of the forming machine to the loading end of the lehr, the articles of ware produced by different molds of a multiple mold machine are so co-mingled as to lose their identity with respect to the mold of the machine on which they were formed. As such, defects found in the ware upon inspection after annealing that are attributable to improper adjustment of the molding cycle of the mold on the multiple mold machine that formed any given article of ware is almost impossible to identify readily. After loading on the lehr, the ware is brought to annealing temperature, annealed at this temperature, and thereafter gradually cooled. This annealing process is necessary to relieve strains present in the ware after completion of its forming cycle by the machine and also prevents further formation of strains in the article arising after it is so formed to shape.

It is, therefore, one of the important objects of the present invention to provide method and apparatus that will eliminate all of the aforementioned handling of the glassware subsequent to transfer by take-out from the mold of the machine and hence reduce substantially the "off-ware" losses resulting from such handling. This handling of the ware is eliminated by the present invention by delivering the ware, after it is formed in the mold of the machine, directly to the lehr mat or conveyor by a single continuous transfer motion.

A further object of the invention is the provision of a method of loading glassware directly from the forming molds of a multiple mold machine to a traveling lehr mat or conveyor for annealing, such that the ware is placed in separate single file rows corresponding to the machine molds that formed the ware and in so doing any article of ware, while still on the lehr mat after annealing, is identifiable with respect to its forming mold on the machine. This is very advantageous to the production processes in the bottle plant since, as the ware arrives at the unloading end of the lehr, it is inspected for defects prior to packing and defects discovered in any of the ware at inspection may be attributable to and identified with a particular machine mold. This information, when relayed to the machine operator, may permit him to make adjustments to the cycle of that mold on the machine to correct for and eliminate the defect, with a minimum production loss.

Another object of the present invention is to provide method and apparatus for annealing glassware articles upon direct delivery from the forming mold of the machine to the conveyor mechanism of an annealing lehr, the conveyor mechanism being located to travel adjacent the discharge side of the forming machine. The invention includes additionally the application of controlled chilling to the ware at the time of delivery to the lehr conveyor, this chilling effect being administered to the extent necessary only to rigidify the ware sufficiently to maintain its finished shape. This invention eliminates all handling subsequent to transfer from the forming mold on the machine, for example, eliminates dead plates, push outs, machine conveyors, transfer wheels, closed conveyors, and lehr loaders, all these mechanisms being utilized heretofore; and thereby eliminates defects in the ware normally arising through the use of such equipment.

Another object of the invention is the provision of an improved cycle in the annealing lehr wherein the glassware articles are delivered from the machine molds directly to a straight line lehr conveyor and deposited thereon in a plurality of single file rows which are initially chilled and then moved in sequence through a heated conditioning zone or section of the lehr which adjusts the temperature of the ware between the various rows deposited on the lehr conveyor by bringing them to temperatures that are substantially the same. The conditioned ware is then moved through an annealing zone or section to progressively bring the temperature of the articles within a relatively short time interval to their annealing temperature and therein maintained at that temperature level for a short period. The ware is then moved through a temperatue controlled cooling zone for progressively cooling the articles from annealing temperature to a lower temperature at which the ware may be readily handled without damage.

Another object of the invention is to provide an improved heating chamber for use in glassware annealing lehrs, wherein air is heated and forced under accurate control in a continuous circulation across the glassware articles being moved through the chamber.

Still another object of the invention, in conjunction with the foregoing object, is provision of an improved glassware annealing lehr having conditioning, annealing, and controlled cooling sections, each said section utilizing an improved heating chamber, just mentioned, and each section being capable of independent control for accurately controlling temperature therein.

Another important object of the invention is the provision of an improved annealing lehr capable of accurate temperature control, whereby the entire annealing cycle of glassware from the time such ware is fed to it until the ware is ready for removal therefrom may be completed, compared with prior devices, in a relatively short time, such as for example, in twenty minutes.

A further object of the present invention is to provide a glassware annealing lehr made up of a plurality of similar heating chambers, just mentioned, connected end-to-end to make up individually controllable conditioning annealing and controlled cooling zones of such lehr.

Other objects and advantages of the present invention will become apparent from reading the following description of a preferred embodiment, the appended claims, and the accompanying drawings of the preferred embodiment to which reference is made and in which:

FIG. 3A is a partial plan view taken along line 3A—3A of FIG. 3.

Figure 1:
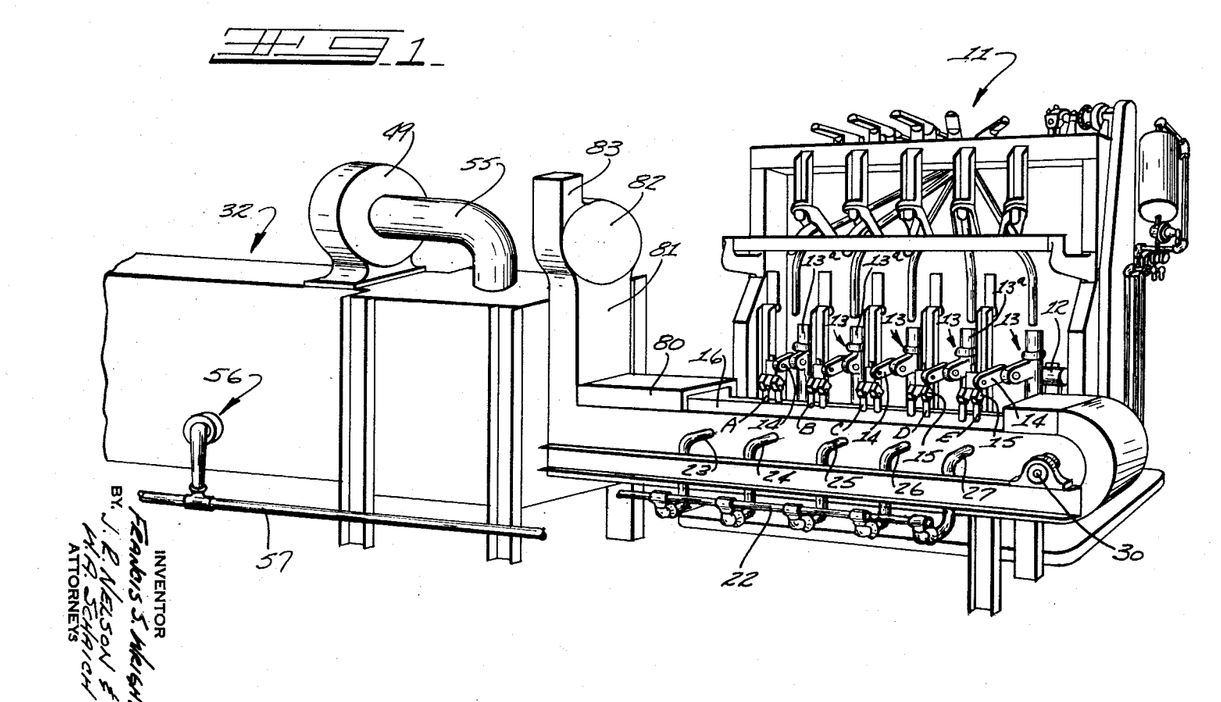
FIG. 1 is a perspective side view showing, in operating combination according to the present invention, a well-known Hartford-Empire "IS" bottle forming machine and the loading end portion of the annealing lehr of the invention which is shown being loaded with jars transferred directly from the forming machine molds to the conveyor of the lehr.

In the preferred embodiment of the invention illustrated in the accompanying drawings, and in particular FIG. 1, glassware articles, herein shown as jars 10, are blow molded in the finishing molds of the forming machine, referred to generally as 11. The forming machine herein illustrated is the well-known Hartford-Empire "IS" type machine having five stationary side-by-side forming sections. This type machine is more fully disclosed in U.S. Patent No. 1,911,119 to H. W. Ingle. Each section of the machine includes a blow mold 12 (only one of which appears on the drawings), wherein the jars 10 are blown to finished shape. The blow molds 12 are sequentially opened after each blowing cycle is completed to permit removal of the formed article. The operation of the "IS" machine in performing the foregoing forming cycle is generally known and understood by persons skilled in the glass bottle industry and, therefore, should not need further description of the forming operations of the machine.

Normally provided as a part of each section of the commercial model of this type of forming machine is a bottle take-out device mounted along the machine frame and driven by air motors for gripping the formed article while resting in the mold 12 and, through the pivotal movement of a rocker arm, transfers the bottle or jar from the mold to the discharge side of the machine and deposits the ware on a dead plate. In this invention, however, the dead plate and machine conveyor are removed from the machine and the take-out devices, referred to generally as 13, are relocated and supported on columns 13a attached to the side frame of the machine 11. The take-out devices 13 are assembled to be driven in sequence with the operation of the machine through a cycle for removing formed articles from the molds of the machine after each forming cycle is completed and the molds opened. The length of the arm 14 varies as between the take-out devices 13 on each of the sections of the machine and columns 13a are provided at the proper horizontal distance from the vertical center line of each finishing mold 12 according to the length of rocker arm 14 employed on the take-out 13 of a particular machine section. By so doing, the articles transferred from the molds 12 are placed in separate rows, as will be apparent from the following description. The take-out tongs 15 of each take-out device 13 are pivotally mounted for carriage at the outer edge of arm 14 thereof and are operated in sequence to grip the jars 10 while in the open mold 12 and hold them during transfer by the pivotal movement of the arm 14 away from the mold to a location a horizontal distance remote from the mold and fixed by the rotation of the rocker arm 14 for each of the different molding sections of the machine. This pivotal movement of the arm 14 for each take-out device 13 is terminated at a fixed spot overlying the lehr conveyor belt 16. At this location, their tongs 15 release the jars 10 whereupon they settle onto the lehr conveyor for movement thereon through the heated chambers of the lehr, as will hereinafter be described.

Utilizing a five section "IS" machine, the jars 10 are deposited on the conveyor 16 in five single file rows, each take-out device 13 delivering formed jars 10 to separate rows on the lehr conveyor 16. This is accomplished, as aforementioned, by having the arms 14 of the take-out devices 13 of different lengths and having their mounted columns 13a staggered at the proper operating distance from the molds along the machine frame. If FIG. 1 illustrates the first jars 10 being deposited onto the conveyor from each mold on the various sections of the machine, it is apparent that the beginning or loading end of the resulting rows of jars formed after continuous operation will be progressively staggered across the conveyor 16. This staggering may be arranged in any number of ways to form separate rows of bottles on the conveyor, but one such staggering arrangement being shown on the drawings. Any staggering arrangement, as just mentioned, accomplishes one of the objects of the invention, because all the jars delivered in any one of the rows on the conveyor 16 will originate from the same mold 12 of the machine. As will become apparent as this description progresses, the jars in any one of the rows as they all emerge from the annealing lehr will hence be identifiable with the mold that made them.

Referring to FIG. 3A, the phantom outline of the jars 10 illustrates, in a plan view, the single file rows on the conveyor 16, these rows being indicated by reference letters A through E.

After the jars 10 are deposited in the above-mentioned rows on the conveyor belt 16, they are subjected to a chilling effect of cooling air being directed upwardly from the underlying wind boxes 17, 18, 19, 20, and 21. As seen in FIG. 3A, each of these wind boxes, for example wind box 17, extends along the initial span of travel of the jars 10 being deposited in row A. The other wind boxes 18–21 are similarly situated with respect to their corresponding rows of jars B–E starting under the deposit point for each bottle of the row and extending in the direction of travel of the row on the conveyor. The wind boxes are supplied by cooling air in the header 22 which is connected to a source of cooling wind (not shown). The header 22 is connected to each of the wind boxes 17–21 by conduits numbered, respectively, 23–27. Each of conduits 23–27 has an adjustable control valve 28 (shown schematically only on FIG. 3A) interposed therein to regulate the volume of cooling wind being transmitted through each of the wind boxes 17–21. It should also be apparent that the temperature of the cooling wind supplied may be controlled by any convenient manner, which may also contribute to control of its chilling effect. Hence, as the jars 10 are deposited by the take-out devices 13 on the lehr conveyor 16, they are subjected to a controlled blast of wind from beneath which may be regulated in intensity to chill the skin surface of the jar for rigidifying it sufficiently to maintain its finished shape and prevent subsequent distortion, sagging, or out-of-round on its way toward annealing.

Figures 2, 2A, 3:
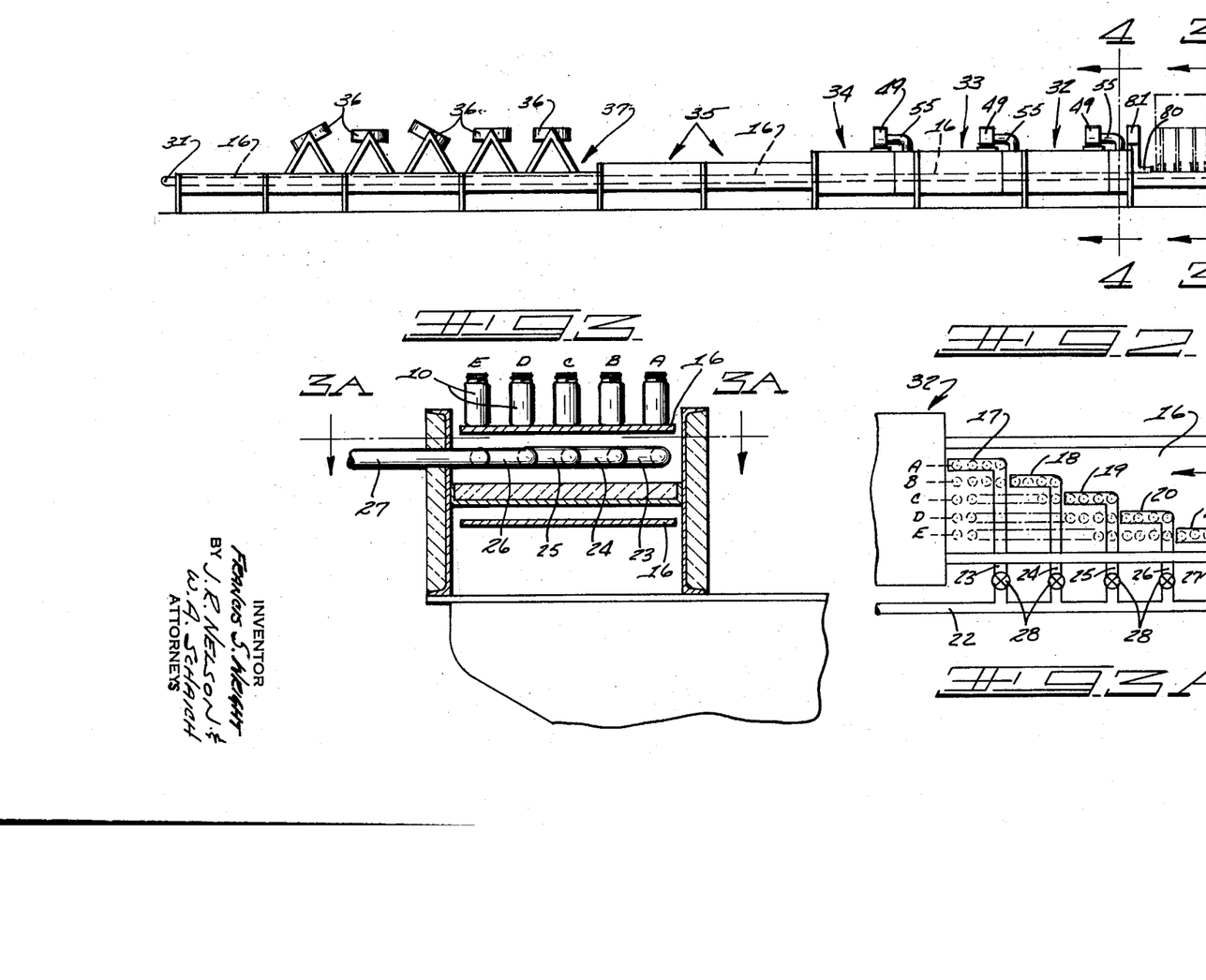
FIG. 2 is a side elevational view of the entire lehr, which was shown only partially in FIG. 1, in operating relationship with its loading end along the side of a forming machine (the latter being shown in phantom view).
FIG. 3 is a sectional end elevation view taken along line 3—3 of FIG. 2, showing the wind boxes for chilling ware placed on the lehr conveyor at its loading end.

Referring to FIGS. 2, the lehr includes the aforementioned conveyor belt 16 which is mounted for travel in endless fashion about spaced end pivots 30 and 31. The conveyor 16 has a span open at the top for loading ware thereon and travels along the take-out side of the forming machine 11, then through enclosed heated chambers comprising a conditioning section 32, annealing section 33, and controlled cooling section 34, each of these sections 32–34 being of similar contruction, which will be hereinafter described in detail. Beyond the controlled cooling section 34 the conveyor travels through an enclosed tunnel section 35, then along a cooling span 37 open at the top whereat wind is blown down over the jars by a plurality of fans 36 mounted on upright frames. At the time the jars on the conveyor arrive at the unloading end of the lehr near the end of the travel of the conveyor about the pivot 31, they are then cooled sufficiently to permit handling, such as inspection and the like, prior to packing the jars in cartons.

Refering now to FIGS. 4, 4A and 5, the novel heated chamber, mentioned in connection with the conditioning, annealing, and controlled cooling sections of the lehr, will be described. As previously mentioned, each of these sections 32–34 are constructed similarly, and each are constructed according to the improved heated chamber of this invention for use in the annealing lehr.

A central walled enclosure composed of a top wall 38, bottom wall 39, and side walls 40 and 41 define a longitudinal duct through the chamber. The interior of the duct has laterally spaced supports 42 and 43 having thereon conveyor guides 44 for the endless conveyor belt 16 reeved for travel therethrough. The top wall 38 and bottom wall 39 of the duct have vertical passages 45 extending therethrough. As seen in FIGS. 4A and 5, the vertical passages 45 in the top wall 38 are in communication with a first chamber 46 formed to overlie the top wall of the duct. Chamber 46 has a top opening and top upright passage 47 which connects with the air outlet passage 48 of a forced air blower 49. The vertical passages in the bottom wall of the duct are in communicacation with an underlying second chamber 50.

Figure 4:
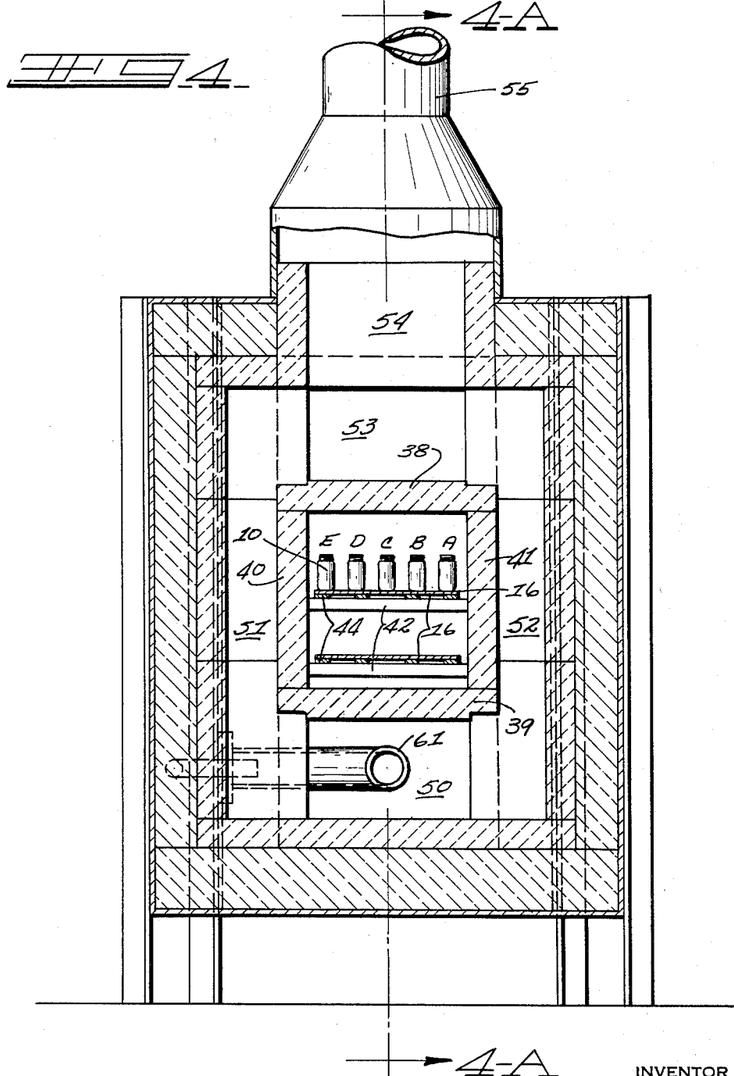
FIG. 4 is a sectional end elevation view taken along line 4—4 of FIG. 2.

The second chamber 50 extends along the bottom wall 39 of the duct and connects with side passages 51 and 52 around one end of the duct and adjacent the side walls 40 and 41 thereof (FIG. 4). These side passages join with a horizontal overhead passage 53 extending transversely across top wall 38 of the duct. A vertical flue passage 54 communicates with the overhead passage 53 and has a pipe 55 connected at its upper end. The pipe 55 extends to an air inlet of the forced air blower 49 (FIG. 1). Blower 49 is driven by a motor air at its air inlet from pipe 55 and forces it through (not shown) and is a rotary type blower that receives its air outlet passage 48 into the first (upper) chamber 46. The air in chamber 46 is forced to circulate through the vertical passages 45 in the top wall 38 of the duct, thence vertically and transversely through the duct leaving by the vertical passages 45 in the bottom wall 39. In this transverse circulation, the air is driven past the surfaces of the jars 10 supported on the length of the conveyor 16 then within the duct. The volume of the air flow through the duct may be regulated in each of the heated sections 32, 33 or 34 (FIG. 2) by regulating the speed or volumetric output of the blower 49 thereof.

Figure 4A:
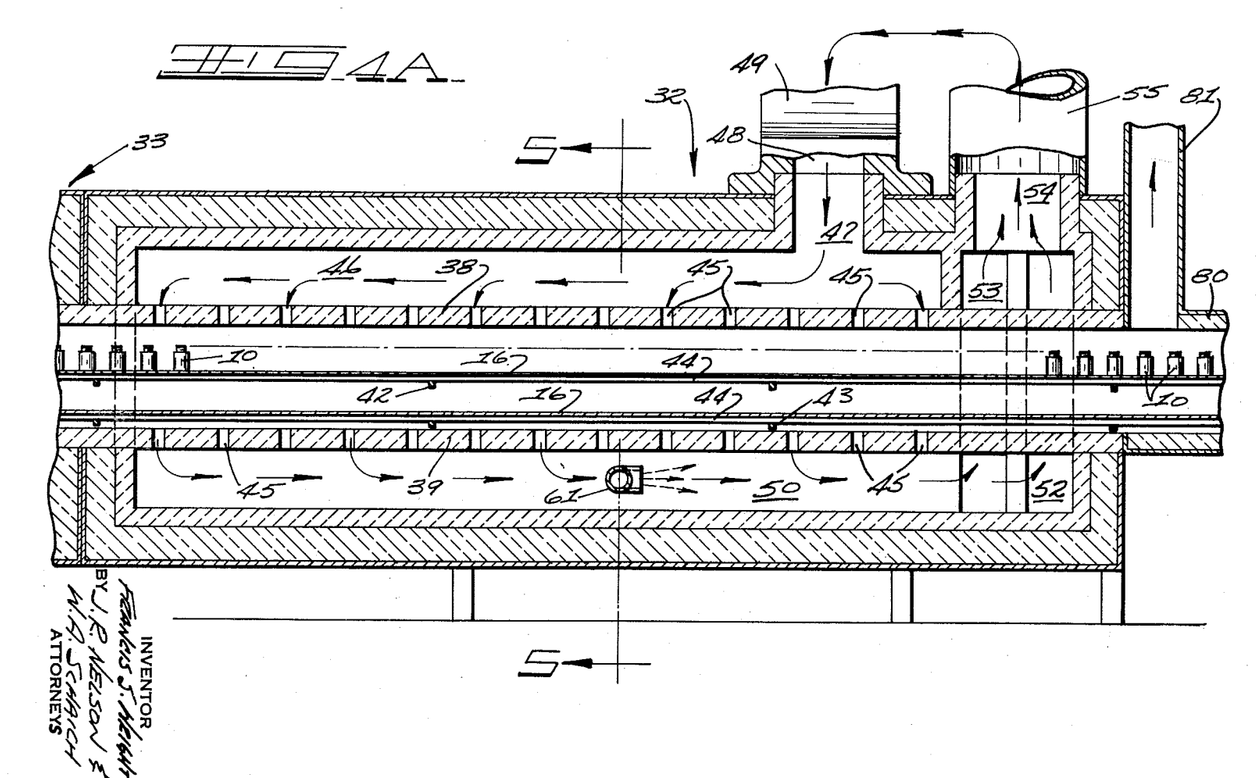
FIG. 4A is a sectional side elevational view taken along line 4A—4A of FIG. 4.
Figure 5:
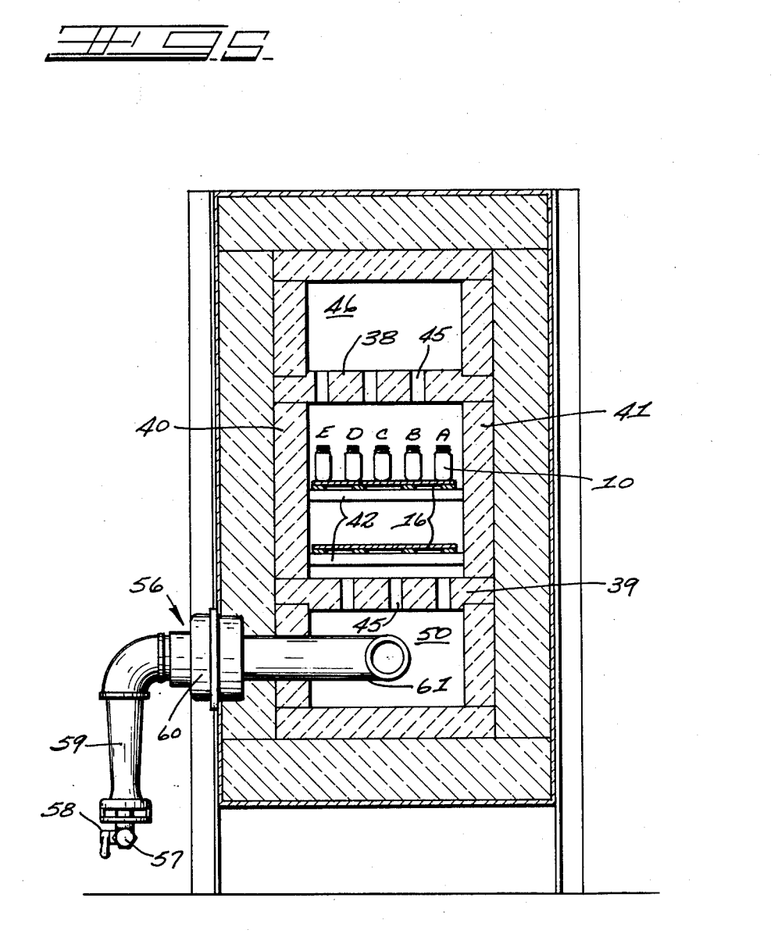
FIG. 5 is a sectional elevation view taken along line 5—5 of FIG. 4A.

The air being circulated is heated to the desired temperature by a gas-fired burner unit 56 or other suitable heater means located in one of the chambers 46 or 50, the burner unit being as herein shown mounted in the second (lower) chamber 50 (FIGS. 4, 4A and 5). One such burner unit which may be selected for heating the air is a Series 104 Gas Burner Unit for Air Heaters sold by the North American Mfg. Co., described fully in their bulletin No. 104, issued December 1954. The burner is designed for use on a pull through air supply and operates under conditions of suction or negative draft. Fuel, preferably in the form of natural gas, is carried in supply main 57 and is piped along the side of the heating chambers 32, 33 and 34 (FIG. 1). Each burner of the three heating chambers of the lehr is connected to the supply main through a limiting orifice valve 58 and an inspirator 59 (FIG. 5) The inspirator mixes the proper combustible mixture of gas and outside air and is connected to the burner head which includes a gas pilot for lighting and starting the burner. The flame from the burner is issued from the burner pipe 61 which opens down wind in chamber 50 (FIG. 4A). The burning of gas fuel thus heats the air being circulated through chamber 50 and this air, after being heated sufficiently, travels through the side passages 51 or 52 (FIG. 4), the overhead cross passage 53, the vertical passage 54, pipe 55 into the air inlet of the blower 49, which then forces it through the air outlet of the blower, thence through upright passage 47, the first chamber 46, the vertical passages 45, which perforate the effective heating length of the duct, for causing circulation of the heated air downwardly across the bottles carried in the duct. This circulation is indicated generally by arrows on FIG. 4A.

As previously mentioned in conjunction with FIG. 2, three heated chamber structures, just described, are connected end to end so that the duct of each registers with the duct of the adjacent chamber. The endless conveyor mat or belt 16 is then assembled to travel through this duct. The air circulation of the first heating chamber 32 is regulated to the proper volume of air movement by a setting of its blower 49 and the gas supply to its burner unit 56 is regulated so that the heating effect of the heated air moving over the rows of jars in that section will bring the articles in each of the rows to substantially the same temperature. This heating control is demonstrated on the graph of FIG. 6. The temperatures of jars 10 were measured in the various rows A–E as they were moved through the heating chambers of the lehr. The linear speed of the conveyor 16 in the aforementioned example data was at 61 inches per minute. The temperatures were recorded beginning at the point of entry of the jars into the duct of the heating chamber 32 ("0" distance). The jars in row A at this point were about 1100° F. which is the highest temperature among all the rows A'–E due to the fact that the jars of row A, being deposited very near the entry of the conditioning section, have the least time to cool. The other rows B–E are deposited at progressively greater distances from this entry point by reason of the arrangement of the take-out units of the machiine sections.

Figure 6:
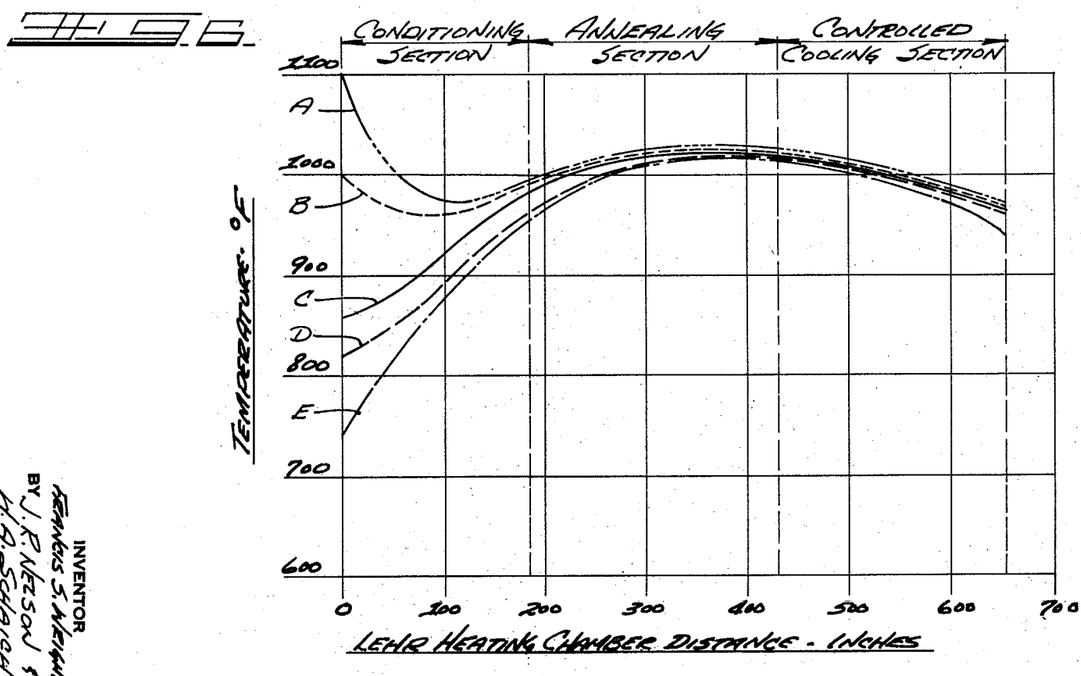
FIG. 6 is a chart illustrating an operating example under actual performance of the invention, and in which the temperatures of glassware fed to the lehr in five single file rows are plotted according to the position of these rows during movement through the controlled heated zones of the lehr.

As indicated on the graph, the heating chamber serving as the conditioning section or zone of the lehr in this example is approximately 180 inches in length. The mean heating effect of the temperature being maintained in the duct of that zone was about 950–980° F. and was controlled by regulation of the gas burner unit 56 and the blower 49. Hence, as can be seen, the jars in the various rows entered the heated conditioning zone at temperatures of 1100° F., 1000° F., 860° F., 820° F., and 750° F., and were brought to substantially similar temperatures grouped between 960° F. and 995° F. These temperatures could actually be grouped closer together if need be by adjusting either the conveyor speed or lengthening the heating chamber 32. When the jars leave the conditioning section they immediately enter the annealing section 33 and are then just slightly below annealing temperature. It appears from this example that the annealing temperature for the particular ware being treated is about 1010° F. The air circulation and gas heating in the annealing zone are adjusted to produce a temperature of the ware at an annealing temperature. The annealing section 33 in the present example is approximately 256 inches in length.

After the ware leaves the annealing section it immediately enters the heated chamber 34 which is regulated in temperature as a controlled cooling section or zone. The burner unit and burner is regulated to produce a temperature of about 900° F. In the present example, this cooling section is approximately 240 inches in length.

After the ware emerges from the controlled cooling section 34 it passes through a refractory tunnel section 35 which is of sufficient length to allow the ware to cool to a temperature at which it can be subjected to ambient air or cooling wind on the open span 37 of the lehr. Cooling of the ware is accelerated by air circulated down onto it by the fans 36 mounted overhead.

In the example of the operation of the invention just described, the ware, from the time of its loading onto the lehr mat directly from the forming mold to the time of its removal at the unloading end of the lehr on section 37, consumes approximately 20 minutes.

Since operators and other factory personnel work near the loading end of the lehr, a safety feature is provided, and is shown on the drawings in FIGS. 1, 2, and 4A, which prevents hot gases from blowing out of the entrance of the duct at the conditioning section 32. The structure of this feature comprises a hood 80 across the entrance to the duct of the heating chamber of the conditioning section 32 and is an outward horizontal extension of that duct. A vertical flue 81 extends upwardly from the top of the hood adjacent this duct entrance and communicates with the hood 80. The flue may exhaust to the atmosphere, however, it is preferable to mount a fan 82 across the flue 81 to control the volume of hot gases being expelled. An exhaust duct 83 is incorporated at the outlet side of the fan 82 and may be extended to a remote location for exhausting the hot gases without danger to machine operator personnel.

Various modifications may be resorted to within the spirit and scope of the appended claims.

I claim:

1. A method for continuously delivering and annealing glassware articles formed by a machine having a plurality of side-by-side, stationary forming molds, comprising gripping the formed articles sequentially and transferring them from their mold of said plurality of forming molds in individual paths of continuous movement, each in a vertical plane that passes through its said mold, and each path terminating at different fixed locations remote from its related forming mold, releasing the articles at said locations for support on an underlying horizontal conveyor surface moving in a straight line path transversely to said planes of transfer and away from said locations, subjecting each supported article to surface chilling controlled to rigidfy the articles sufficiently to maintain their finished shape, modifying the temperature of the articles in a heated zone along their said path of movement on the conveyor to bring the articles in each of said rows to substantially the same temperature, bringing the conditioned articles to annealing temperature in a subsequent heated zone along their path of movement, and thereafter progressively cooling the articles from annealing temperature to handling temperature.

2. Glassware handling and annealing apparatus for use with a glassware forming machine which is provided with a plurality of side-by-side, longitudinally aligned, fixed forming molds, comprising an annealing lehr provided with conveyor means arranged to travel in a direction extending along and successively past the said aligned molds for continuously moving ware in a straight path through the lehr and at a relatively slow constant speed, means for sequentially taking formed glassware articles out of the machine forming molds and transferring them in a continuous arcuate movement in a vertical plane extending from each mold in a direction transversely of the longitudinal alignment thereof to individual fixed locations overlying said conveyor means, each said individual location being laterally spaced from the others, said means being adapted to release said articles to the conveyor means at said locations to form plural rows of transferred ware thereon so that the ware in each row corresponds with the mold from which it was transferred, a temperature conditioning section laterally enveloping said lehr conveyor means and through which the last-mentioned means travels at the forward portion of said lehr for establishing substantially equal temperatures of the said articles in each of said rows traveling therethrough, an annealing section laterally enveloping said conveyor means adjacent said conditioning section for progressively bringing said articles to their annealing temperature, and means for thereafter progressively cooling the articles from annealing temperature to handling temperature.

3. Glassware handling and annealing apparatus for use with a glassware forming machine which is provided with a plurality of side-by-side, longitudinally aligned, fixed forming molds, comprising an annealing lehr provided with conveyor means arranged to travel along the alignment of said molds and successively past them for continuously moving ware in a straight path and at a relatively slow constant speed through the lehr, plural take-out means each having a transfer arm pivoted at the side of the machine and operable for oscillatory movement, each transfer arm having ware handling tongs adapted to grip formed glassware articles and transfer them sequentially from the forming molds to fixed locations overlying said conveyor means and release said glassware articles at said locations to thereby form a plurality of single file rows of articles on said conveyor means, each row corresponding to the mold of origin of the articles therein, chilling means effective along a defined length of the initial traveling movement of the ware on said conveyor means for applying a coolant to the articles in said single file rows to rigidify said articles sufficiently to maintain their finished shape, a conditioning section at the forward portion of said lehr through which the conveyor means travels and including heating means for establishing substantially equal temperatures of said articles in each of said rows traveling therethrough, an annealing section adjacent and subsequent to said conditioning section along the lehr including means for progressively heating said articles to an annealing temperature, and a cooling section adjacent and subsequent to said annealing section along the lehr including means for progressively cooling said articles to a temperature permitting handling.

4. The method of handling glassware for annealing which is formed by a plural mold machining having a plurality of longitudinally aligned, spaced, stationary ware forming mechanisms comprising directing a belt conveyor successively and continuously past said plural ware forming mechanisms and thence through an annealing lehr, transferring ware from each of said ware forming mechanisms and depositing the ware upon said belt, the transfer of the ware from each of the forming mechanisms being made at a different lateral location with respect to the edges of the belt to form a plurality of individual single file rows of the ware upon deposit thereof on the belt, and modifying the temperature of the deposited ware as it travels from the point of deposit to said annealing section of the lehr to substantially equalize the temperature of all ware entering said lehr annealing section.

5. Apparatus for handling glassware for annealing which is formed by a plural mold machine having a plurality of longitudinally aligned, spaced, stationary ware forming mechanisms, comprising an annealing lehr having a belt conveyor arranged to move continuously at a constant speed successively past all of said plural ware forming mechanisms and thence through the annealing section of said lehr, separate transfer mechanisms for each said plural forming mechanism each including a transfer arm pivoted and operated through oscillatory movement for transferring the ware formed on its said ware forming mechanism, said transfer mechanisms depositing said ware upon said belt in plural, spaced, single file rows, and means for modifying the temperature of the deposited ware in each said row as it travels from the point of deposit to the annealing section of said lehr to substantially equalize the temperature of all the ware in said plural rows entering said lehr annealing section.

References Cited in the file of this patent

UNITED STATES PATENTS

| | | |
|---|---|---|
| 1,618,660 | Howard | Feb. 22, 1927 |
| 1,626,738 | La France | May 3, 1927 |
| 1,705,955 | Barker | Mar. 19, 1929 |
| 1,733,987 | Ingle | Oct. 29, 1929 |
| 1,783,939 | Schroder | Dec. 2, 1930 |
| 1,890,883 | Morton et al. | Dec. 13, 1932 |
| 1,894,576 | Tremblay | Jan. 17, 1933 |
| 1,921,390 | Ingle | Aug. 8, 1933 |
| 2,045,259 | Batchell | June 23, 1936 |
| 2,089,250 | Cone | Aug. 10, 1937 |
| 2,253,155 | Wadman et al. | Aug. 19, 1941 |
| 2,634,552 | Woolling | Apr. 14, 1953 |
| 2,660,831 | Rowe | Dec. 1, 1953 |